United States Patent
Okada et al.

(10) Patent No.: US 12,031,960 B2
(45) Date of Patent: Jul. 9, 2024

(54) ANALYTICAL INSTRUMENT AND ANALYSIS SYSTEM

(71) Applicant: SHIMADZU CORPORATION, Kyoto (JP)

(72) Inventors: Masayuki Okada, Kyoto (JP); Masahiro Kojima, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 119 days.

(21) Appl. No.: 17/476,651

(22) Filed: Sep. 16, 2021

(65) Prior Publication Data
US 2022/0146467 A1 May 12, 2022

(30) Foreign Application Priority Data
Nov. 10, 2020 (JP) ................. 2020-187058

(51) Int. Cl.
*G01N 30/24* (2006.01)
*G01N 30/02* (2006.01)

(52) U.S. Cl.
CPC ....... *G01N 30/24* (2013.01); *G01N 2030/025* (2013.01)

(58) Field of Classification Search
CPC .................................................. G01N 30/24
See application file for complete search history.

(56) References Cited

U.S. PATENT DOCUMENTS 3,754,443 A * 8/1973 Harris, Sr. ......... G01N 35/1079
  73/863.81
4,944,781 A * 7/1990 Ruggirello ............. G01N 30/24
  73/23.41

(Continued)

FOREIGN PATENT DOCUMENTS

CN         212228854    * 12/2020
JP         2006107929   *  4/2006

(Continued)

OTHER PUBLICATIONS

Office Action issued Aug. 4, 2023 in Chinese Application No. 202110955583.3.

(Continued)

*Primary Examiner* — Jamel E Williams
*Assistant Examiner* — Alex T Devito
(74) *Attorney, Agent, or Firm* — Sughrue Mion, PLLC

(57) ABSTRACT

To make a cable connected to an analytical instrument less likely to cause interference. An analytical instrument (2) includes an executing part (18) configured to execute an operation related to an analysis, and an electrical circuit (20) electrically connected to the executing part (18). The analytical instrument (2) constitutes an analysis system (1) together with an analysis device (100). A plurality of connection ports (10; 12) configured to receive a cable (200; 300) coming from outside of the analytical instrument (1) are provided at different positions in a manner that directions for receiving the cable (200; 300) are different from each other. The analytical instrument (1) is configured to connect electrically the electrical circuit (20) with the cable (200; 300) connected to a connection port which is optionally selected among the plurality of connection ports (10; 12).

6 Claims, 5 Drawing Sheets

(56) References Cited

U.S. PATENT DOCUMENTS

| | | | | |
|---|---|---|---|---|
| 5,045,172 A * | 9/1991 | Guzman | .......... | G01N 27/44756 |
| | | | | 204/603 |
| 6,188,569 B1 * | 2/2001 | Minemoto | ................ | G06F 1/16 |
| | | | | 312/265.6 |
| 6,834,531 B2 * | 12/2004 | Rust | ........................ | F27D 11/00 |
| | | | | 95/82 |
| 7,394,165 B2 * | 7/2008 | Schiller | .................. | A45C 15/00 |
| | | | | 290/1 R |
| 2013/0027863 A1 | 1/2013 | Tsai et al. | | |

FOREIGN PATENT DOCUMENTS

| | | | | | |
|---|---|---|---|---|---|
| JP | 4245779 | B2 * | 4/2009 | | |
| JP | 2013025822 | A | 2/2013 | | |
| JP | 5416138 | B2 * | 2/2014 | .............. | A61M 1/14 |
| JP | 2016-118530 | A | 6/2016 | | |
| KR | 200266386 | | * | 3/2002 | |
| WO | WO2007032088 | | * | 3/2007 | |

OTHER PUBLICATIONS

Japanese Office Action issued Sep. 26, 2023 in Application No. 2020-187058.

* cited by examiner

ANALYTICAL INSTRUMENT AND ANALYSIS SYSTEM

BACKGROUND OF THE INVENTION

1. Field of the Invention

The present invention relates to an analytical instrument and an analysis system.

2. Description of the Related Art

An analysis system such as a gas chromatography analysis system is constructed by combining an analytical instrument such as an auto injector with a gas chromatograph (analysis device). An auto injector is a device that is arranged on a gas chromatograph and automatically injects a sample into a sample vaporizing chamber of the gas chromatograph. An analytical instrument such as an auto injector needs to receive power supply and synchronize operation with a gas chromatograph or other devices, and is electrically connected to a gas chromatograph or the like via a cable.

SUMMARY OF THE INVENTION

An analytical instrument, such as an auto injector, may be arranged on a gas chromatograph in various orientations. For this reason, depending on an arrangement direction of an auto injector, there may occur a problem that a cable connected to the auto injector protrudes to the front or the side of the analysis system and becomes an obstacle when the user works or interferes with other optional devices.

Further, in addition to a case where two auto injectors are used in combination, there is a case where an auto sampler that conveys a sample is added to the auto injector. Also in such a case, there may occur a problem that a cable connected to the auto injector hinders arrangement of an additional auto injector or an auto sampler.

In view of the above, an object of the present invention is to make it less likely for a cable connected to an analytical instrument to cause interference.

An analytical instrument according to the present invention includes an executing part configured to execute an operation related to an analysis, and an electrical circuit that is electrically connected to the executing part, the analytical instrument constituting an analysis system together with an analysis device. A plurality of connection ports configured to receive a cable coming from outside of the analytical instrument are provided at different positions in a manner that directions for receiving the cable are different from each other, and the analytical instrument is configured to connect electrically the electrical circuit with the cable connected to a connection port which is optionally selected among the plurality of the connection ports.

An analysis system according to the present invention includes a gas chromatograph having a front surface and a rear surface, a first auto injector arranged on the gas chromatograph in a manner that a front surface of the first auto injector is directed to the same direction as the front surface of the gas chromatograph, the first auto injector being electrically connected to the gas chromatograph via a first cable, and a second auto injector arranged on the gas chromatograph in a manner that a rear surface of the second auto injector faces a rear surface of the first auto injector, the second auto injector being electrically connected to the gas chromatograph via a second cable. Each of the first auto injector and the second auto injector is the analytical instrument according to the present invention described above, and the first auto injector receives the first cable from the backward, and the second auto injector receives the second cable from forward.

The analytical instrument according to the present invention includes a plurality of connection ports provided to receive a cable from directions different from each other at positions different from each other, and a cable connected to optionally selected connection port among the plurality of connection ports is electrically connected with the electrical circuit. Therefore, the user can select a connection position of the cable to the analytical instrument so that the cable connected to the analytical instrument does not become an obstacle to work or interfere with other devices. In this manner, the cable connected to the analytical instrument is less likely to interfere with the work of the user or other devices.

According to the analysis system according to the present invention, although two of the auto injectors are arranged in a manner that rear surfaces of the auto injectors face each other on the gas chromatograph, both of cables connected to the two auto injectors protrude to the rear surface side of the gas chromatograph. For this reason, it is possible to prevent the cable connected to each of the auto injectors from becoming an obstacle to work or interfering with other devices.

DETAILED DESCRIPTION OF THE INVENTION

Hereinafter, an embodiment of an analytical instrument according to the present invention and an embodiment of an analysis system including the analytical instrument will be described with reference to the drawings.

Figure 1:
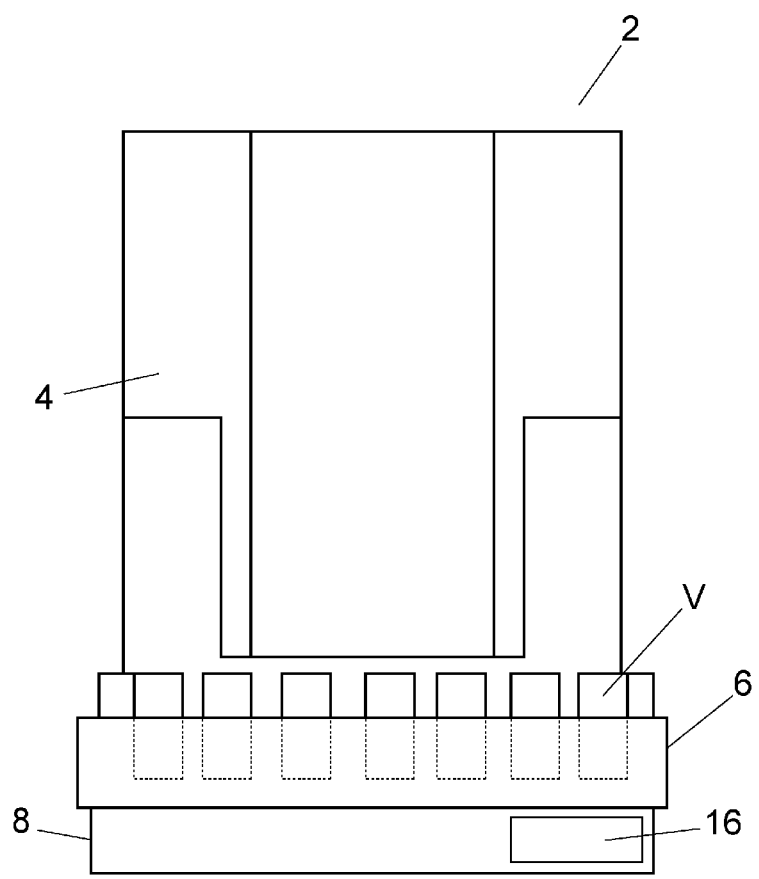
FIG. 1 is a front view of an embodiment of an auto injector.
Figure 2:
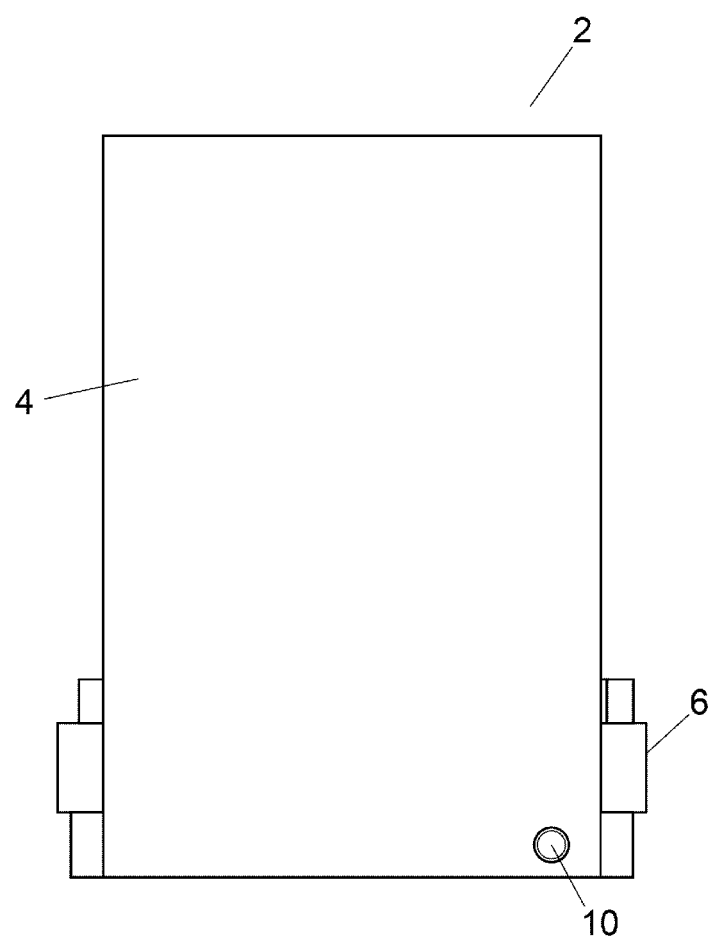
FIG. 2 is a rear view of the embodiment.
Figure 3:
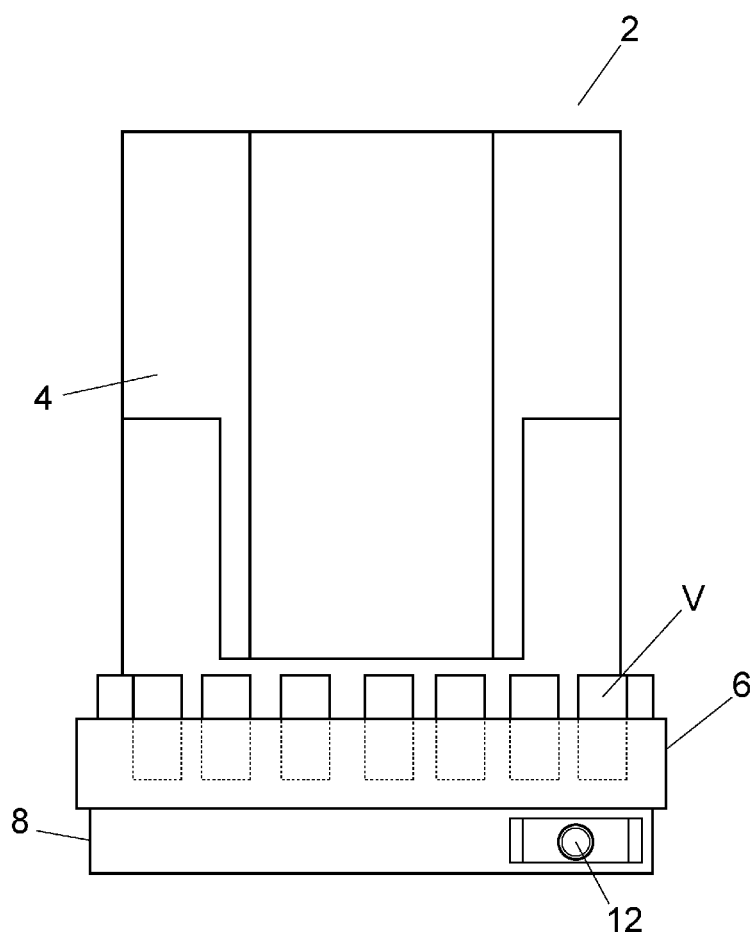
FIG. 3 is a front view illustrating a state in which a port cover of the embodiment is removed.

An embodiment of the analytical instrument will be described with reference to FIGS. 1 to 3. FIGS. 1 and 3 are front views, and FIG. 2 is a rear view. Here, an auto injector for gas chromatography analysis will be described as an example of the analytical instrument.

The auto injector 2 includes an injector main body 4, a turret 6, and a base 8. The injector main body 4 and the base 8 are integrated.

The turret 6 is a circular table that rotates in a horizontal plane on the base 8. In the turret 6, a plurality of vials V containing liquid such as a sample and a solvent are set on the same circumference, and each of the vials V is conveyed along a circular track as the turret 6 rotates. The base 8 includes a turret drive mechanism (not shown) for rotationally driving the turret 6.

Inside the injector main body 4, a sampling mechanism (not shown) for collecting liquid from a vial set in the turret 6 and injecting the liquid into a gas chromatograph which is an analysis device is provided. The sampling mechanism includes a syringe for sucking and discharging liquid and a syringe drive mechanism for driving the syringe.

The turret drive mechanism and the syringe drive mechanism constitute an executing part 18 (see FIG. 4) for executing operation related to analysis. Further, an electrical circuit 20 (see FIG. 4) that is electrically connected to the executing part 18 and performs power supply to the executing part 18 and operation control of the executing part 18 is provided inside the injector main body 4.

The auto injector 2 includes two connection ports 10 and 12 for receiving a cable. The connection port 10 is a main port that is constantly exposed to the rear surface side, and is provided to receive a cable from backward of the auto injector 2. The connection port 12 is a sub-port that is normally covered with a detachable cover 16, and is provided so as to be exposed to the front surface side and receive a cable from forward of the auto injector 2 when the cover 16 is removed. The electrical circuit 20 (see FIG. 4) in the injector main body 4 is electrically conductive with both the connection ports 10 and 12, and the user can use any of the connection ports 10 and 12.

Although the injector 2 includes two connection ports 10 and 12 for receiving a cable from backward and forward in the present embodiment, the present invention is not limited to such a configuration. Thus, the injector 2 may include a connection port for receiving a cable from other directions in addition to the connection ports 10 and 12 or instead of the connection ports 10 and 12.

Figure 4:
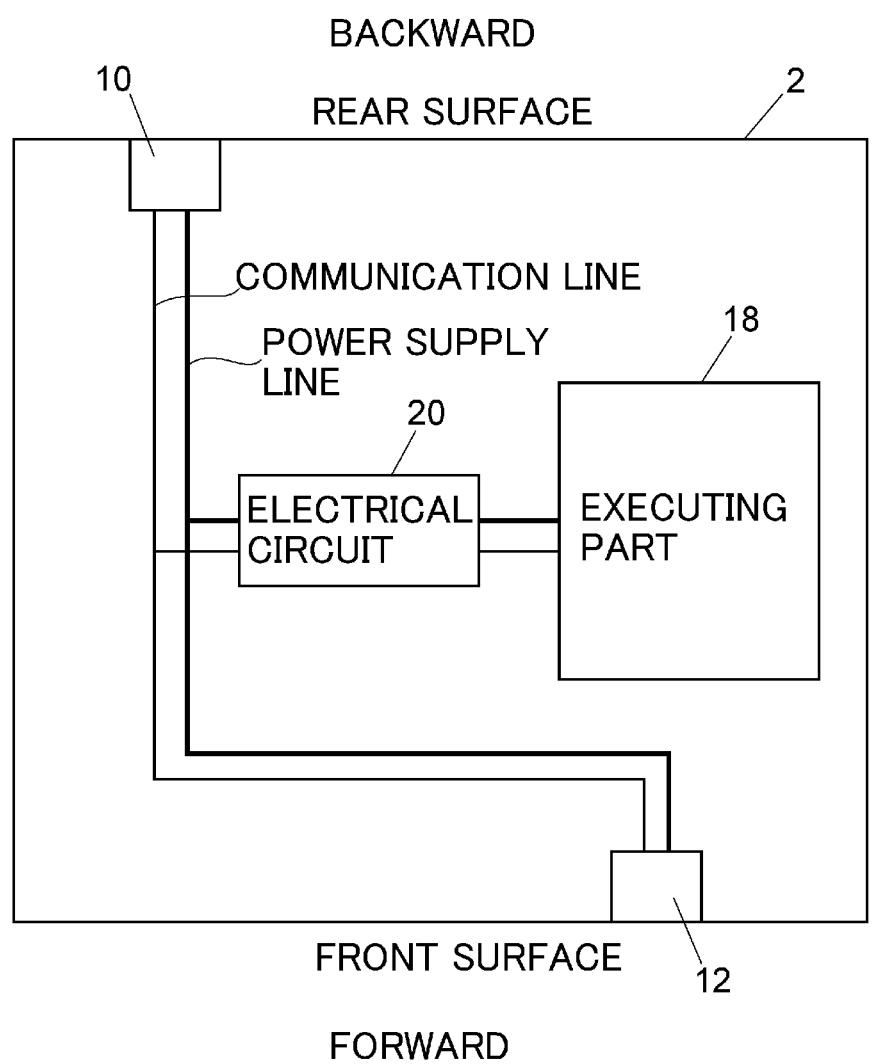
FIG. 4 is a conceptual diagram illustrating an electric wiring structure of the embodiment.

FIG. 4 is a conceptual diagram illustrating an example of a wiring structure in the auto injector 2.

The electrical circuit 20 includes a control circuit for controlling operation of the executing part 18 including the turret drive mechanism and the syringe drive mechanism, and a power supply circuit for supplying power to the executing part 18. A communication line and a power supply line are drawn from the electrical circuit 20. The communication line is used to communicate with a gas chromatograph or the like, and the power supply line is used to receive power supply from the outside. Both the communication line and the power supply line are branched and drawn to the connection ports 10 and 12. The electrical circuit 20 is configured to be electrically conductive with a cable connected to either one of the connection ports 10 and 12, and is configured to communicate with a gas chromatograph or the like via the cable connected to either one of the connection ports 10 or 12 and receive power supply at the same time.

Further, in the present embodiment, it is assumed that a cable having functions as a communication cable and a power cable is used as the cable connected to the connection port 10 or 12. On the other hand, the present invention is not limited to this configuration, and a communication cable and a power cable may be used. In such a case, a connection port for connecting the communication cable and/or a connection port for connecting the power cable can be provided in a plurality of locations of the auto injector 2.

Figure 5:
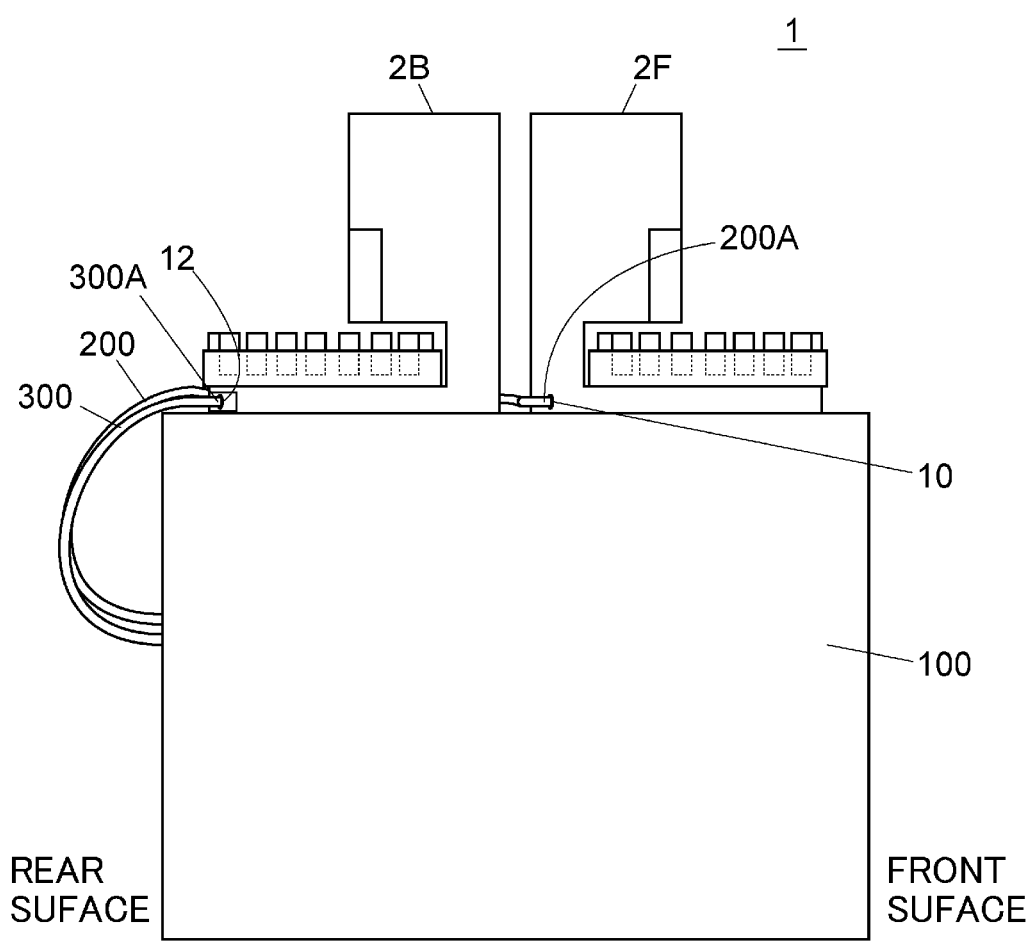
FIG. 5 is a side view illustrating an embodiment of an analysis system including the auto injector.

FIG. 5 is a diagram illustrating an embodiment of the analysis system.

This analysis system 1 includes a gas chromatograph 100 as an analysis device, and auto injectors 2F and 2B mounted on the gas chromatograph 100. The auto injectors 2F and 2B have a configuration equivalent to that of the auto injector 2 described with reference to FIGS. 1 to 4. The auto injectors 2F and 2B are arranged side by side in the front-rear direction (left-right direction in the diagram) of the gas chromatograph 100 in a manner that back surfaces of the auto injectors 2F and 2B face each other. The auto injector 2F (first auto injector) on the front side is directed to the same direction as the gas chromatograph 100 (that is, the front side of the analysis system 1), and the auto injector 2B (second auto injector) on the rear side directed to the opposite direction to the gas chromatograph 100 (that is, the rear side of the analysis system 1).

The auto injector 2F and the gas chromatograph 100 are electrically connected via a cable 200 (first cable), and communication and power supply are performed between them. The auto injector 2B and the gas chromatograph 100 are electrically connected via a cable 300 (second cable), and communication and power supply are performed between them. A connector 200A of the cable 200 is connected to the connection port 10 of the auto injector 2F, and a connector 300A of the cable 300 is connected to the connection port 12 of the auto injector 2B. That is, the auto injector 2F directed forward of the analysis system 1 receives the cable 200 from backward, and the auto injector 2B directed backward of the analysis system 1 receives the cable 300 from forward.

With the above configuration, all of the connections of the cables 200 and 300 to the auto injectors 2F and 2B and the gas chromatograph 100 are made by a system of inserting a connector from backward of the analysis system 1, and a state in which the cables 200 and 300 protrude to the front or the side of the analysis system 1 is avoided. In this manner, when the user performs some work on the front or the side of the analysis system 1, the cables 200 and 300 are less likely to interfere with or become an obstacle to the work of the user. Further, there is a case where an auto sampler is arranged on the side of the auto injectors 2F and 2B. However, even in such a case, the cables 200 and 300 are less likely to interfere with the auto sampler.

Although the embodiments of the analytical instrument and the analysis system is described above by exemplifying an auto injector for gas chromatography analysis, the present invention is not limited to the embodiment, and the present invention can be applied to other analytical instruments constituting an analysis system together with an analysis device. That is, the embodiment described above is merely an example of the analytical instrument and the analysis system according to the present invention. An embodiment of the analytical instrument and the analysis system according to the present invention is as described below.

An embodiment of the analytical instrument according to the present invention includes an executing part configured to execute an operation related to an analysis, and an electrical circuit electrically connected to the executing part, the analytical instrument constituting an analysis system together with an analysis device. A plurality of connection ports configured to receive a cable coming from outside of the analytical instrument are provided at different positions in a manner that directions for receiving the cable are different from each other, and the analytical instrument is configured to connect electrically the electrical circuit with the cable connected to a connection port which is optionally selected among the plurality of the connection ports.

In a first aspect of the above embodiment of the analytical instrument according to the present invention, the cable includes a power cable for supplying power to the electrical circuit.

In a second aspect of the above embodiment of the analytical instrument according to the present invention, the cable includes a communication cable for making communication between the electrical circuit and the analysis device. This second aspect can be combined with the first aspect.

In a third aspect of the above embodiment of the analytical instrument according to the present invention, one of a plurality of the connection ports is a main port that is constantly exposed, and a port other than the main port among a plurality of the connection ports is a sub-port that is exposed only when a detachable cover is removed. With such an aspect, it is necessary to remove the cover when the user wants to use the sub-port, so that cables are prevented from being connected to the main port and the sub-port at the same time. This third aspect can be combined with the first aspect and/or the second aspect described above.

In a fourth aspect of the above embodiment of the analytical instrument according to the present invention, the analytical instrument has a front surface and a rear surface, one of a plurality of the connection ports is directed forward of the analytical instrument, and another one of a plurality of the connection ports is directed backward of the analytical instrument. The fourth aspect can be freely combined with any of the first to third aspects.

In a fifth aspect of the above embodiment of the analytical instrument according to the present invention, the analytical instrument is an auto injector configured to inject a sample into a gas chromatograph that is the analysis device. The fifth aspect can be freely combined with any of the first to fourth aspects.

An embodiment of the analysis system according to the present invention includes a gas chromatograph having a front surface and a rear surface, a first auto injector arranged on the gas chromatograph in a manner that a front surface of the first auto injector is directed to the same direction as the front surface of the gas chromatograph, the first auto injector being electrically connected to the gas chromatograph via a first cable, and a second auto injector arranged on the gas chromatograph in a manner that a rear surface of the second auto injector faces a rear surface of the first auto injector, the second auto injector being electrically connected to the gas chromatograph via a second cable. Both the first auto injector and the second auto injector are the auto injector described above, the first auto injector receives the first cable from backward, and the second auto injector receives the second cable from forward.

DESCRIPTION OF REFERENCE SIGNS 1 analysis system
2, 2F, 2B auto injector (analytical instrument)
4 injector main body
6 turret
8 base
10, 12 connection port
16 cover
18 executing part
20 electrical circuit
100 gas chromatograph (analysis device)
200, 300 cable

What is claimed is:

1. An analytical instrument comprising:
an executing part configured to execute an operation related to an analysis;
an electrical circuit electrically connected to the executing part;
a main body which accommodates the executing part and the electrical circuit therein;
and
a plurality of connection ports, each of the connection ports having a configuration for receiving a same cable coming from outside of the main body, each of the connection ports exposed to the outside of the main body toward different directions with respect to each other, wherein
the analytical instrument constitutes an analysis system together with an analysis device, and
the analytical instrument is configured to connect electrically the electrical circuit with the cable via a selective connection with any one of the plurality of connection ports;
wherein the analytical instrument is an auto injector configured to inject a sample into a gas chromatograph that is the analysis device.

2. The analytical instrument according to claim 1, wherein the same cable includes a power cable for supplying power to the electrical circuit.

3. The analytical instrument according to claim 1, wherein the same cable includes a communication cable for making communication between the electrical circuit and the analysis device.

4. The analytical instrument according to claim 1, wherein one of the plurality of connection ports is a main port that is constantly exposed, and
a port other than the main port among the plurality of connection ports is a sub-port that is exposed only when a detachable cover is removed.

5. The analytical instrument according to claim 1, wherein the main body of the analytical instrument has a front surface and a rear surface, one of the plurality of connection ports is provided at the front surface and is directed forward of the analytical instrument, and another one of the plurality of connection ports is provided at the rear surface and is directed backward of the analytical instrument.

6. An analysis system comprising:
a gas chromatograph having a front surface and a rear surface;
a first auto injector arranged on the gas chromatograph in a manner that a front surface of the first auto injector is directed to the same direction as the front surface of the gas chromatograph, the first auto injector being electrically connected to the gas chromatograph via a first cable; and
a second auto injector arranged on the gas chromatograph in a manner that a rear surface of the second auto injector faces a rear surface of the first auto injector, the second auto injector being electrically connected to the gas chromatograph via a second cable,
wherein
both the first auto injector and the second auto injector are the auto injector according to claim 1,
the first auto injector receives the first cable from the rear surface, and
the second auto injector receives the second cable from the front surface.

* * * * *